United States Patent [19]
Fierle et al.

[11] Patent Number: 6,065,528
[45] Date of Patent: May 23, 2000

[54] AIR PREHEATER CLEANER

[75] Inventors: Kurt M. Fierle; Adam C. Sorochin, both of Wellsville, N.Y.

[73] Assignee: ABB Air Preheater, Inc., Wellsville, N.Y.

[21] Appl. No.: 09/370,693

[22] Filed: Aug. 9, 1999

[51] Int. Cl.[7] .................................................. F28D 17/00
[52] U.S. Cl. ..................................................... 165/5; 165/7
[58] Field of Search ........................................ 165/5, 7, 8

[56] References Cited

U.S. PATENT DOCUMENTS

| | | | |
|---|---|---|---|
| 1,769,987 | 2/1930 | Cox | 165/5 |
| 2,379,506 | 7/1945 | Yerrick et al. | 165/5 |
| 4,025,362 | 5/1977 | Frauenfeld | 165/5 |
| 4,135,534 | 1/1979 | Klutelli | 165/5 |
| 4,649,987 | 3/1987 | Frauenfeld et al. | 165/5 |
| 5,044,424 | 9/1991 | Monro | 165/5 |
| 5,626,184 | 5/1997 | Campbell et al. | 165/5 |
| 5,875,833 | 3/1999 | Schluter | 165/5 |

FOREIGN PATENT DOCUMENTS 0289296  12/1986  Japan .......................................... 165/5

*Primary Examiner*—Christopher Atkinson
*Attorney, Agent, or Firm*—Alix, Yale & Ristas, LLP

[57] ABSTRACT

A swing-arm sootblower for a rotary regenerative air preheater is mounted to sweep across the air preheater rotor at an adjustable constant speed or angular velocity. The sootblower has means for sootblowing with a relatively low pressure medium such as air or steam or with high pressure water. The nozzle unit is equipped with a low pressure nozzle and a plurality of high pressure nozzles. The high pressure nozzles are arranged in a row and the nozzle unit is mounted so that the row is at an angle to the swing arm such that the row of high pressure nozzles is parallel to the heat transfer plates and tangential to the rotor at the outside of the swing of the arm.

2 Claims, 5 Drawing Sheets

AIR PREHEATER CLEANER

BACKGROUND OF THE INVENTION

The present invention relates to sootblowers for rotary regenerative air preheaters and particularly to a swing-arm cleaner moving across the air preheater rotor which is adapted to clean with different mediums and at various pressures.

Soot or other related materials from flue gases tend to deposit over a period of time on the heat transfer surface of the rotor of a rotary regenerative air preheater. As these deposits build up, the flow paths for the air and flue gas become blocked and the heat transfer capacity is reduced. Therefore, it is common for these air preheaters to include devices for blowing air or steam at high velocities into the rotor to dislodge the deposits.

The typical cleaner or sootblower for a rotary regenerative air preheater employs a swing-arm mounted for rotation through a set angle or arc with one or more nozzles at the end which blow the sootblowing medium (air or steam) into the rotor as the rotor turns and as the swing-arm rotates through the arc. The sootblower is normally mounted on the cold end of the rotor, which is the outlet end for the flue gas, but may be mounted as required in either the air or gas duct and either on the cold end or the hot end.

The current prior art sootblowers employ a swing-arm mechanism which is swept across the air preheater rotor at a selectable constant angular velocity from the beginning to the end of the sweep. These swing-arm sootblowers have a constant speed drive assembly, using a motor whose speed is adjustable, adapted to rotate a drive sprocket, preferably with a torque-limiter clutch. The drive sprocket is positively connected to a driven sprocket, such as by a drive chain with the driven sprocket being mounted on a swivel shaft to which the sootblower arm or lance is attached. Means such as limit switches terminate the swivel of the sootblower arm at the ends of its arc of travel toward the center and outside periphery of the rotor and turn off the sootblowing medium. These constant speed swing-arm sootblowers spread the energy of the sootblowing medium evenly over the radius of the rotor, conserve on the use of the sootblowing medium and reduce wear caused by excess medium in certain areas. For a disclosure of such swing-arm sootblowers, see U.S. Pat. No. 5,626,184.

Present sootblower designs have an arm or lance with a single conduit for supplying the cleaning medium to the nozzle at the end of the arm. Although there may be provisions for switching between several cleaning mediums, such as air, steam or water, these cleaning mediums are all at low pressures, i.e., below about 1000 psig. This low pressure washing is not able to effectively clean hardened particulate material that accumulates over the normal operational period of the air preheater. Therefore, it is necessary to periodically shut down the air preheater and use separate high pressure water washing equipment. This process is time consuming, increases cost and increases down time.

SUMMARY OF THE INVENTION

The present invention is directed to swing-arm cleaners for rotary regenerative air preheaters adapted to supply different cleaning mediums at various pressures to the nozzle unit at the end of the arm specifically including high pressure water. More specifically, the nozzle unit is arranged to separately discharge the different cleaning mediums and in particular to discharge the high pressure water through a plurality of high pressure nozzles. The plurality of high pressure nozzles are aligned at an angle with respect to the swing-arm whereby they are generally aligned with the heat exchange plates and tangential to the rotor at the outside of the swing and at an angle to the heat exchange plates and the radius of the rotor at the inside of the swing.

DESCRIPTION OF THE PREFERRED EMBODIMENTS

Figure 1:
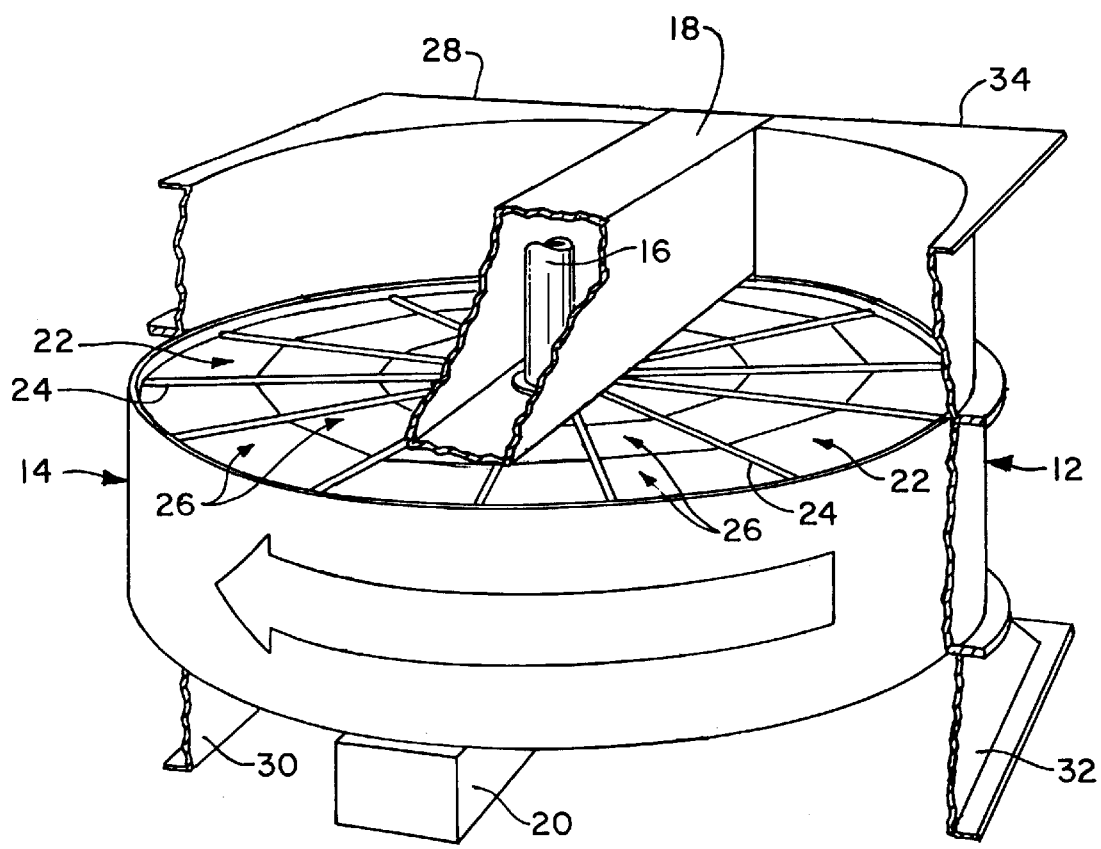
FIG. 1 is a perspective view showing the general arrangement of one type of air preheater with which the present invention may be used.

FIG. 1 of the drawings is a perspective view of a typical air preheater merely intended to illustrate the general type of structure in which the present invention is used. The present invention may be applied to horizontal, vertical (cold end on the top) and vertical inverted (cold end on the bottom) air preheaters. FIG. 1 depicts a vertical air preheater with the cold end on the bottom. The air preheater comprises a rotor housing 12 in which is mounted the heat exchange rotor 14. The rotor is mounted for rotation on the shaft 16 which extends between the upper center section 18 and the lower center section 20. The rotor is divided into sectors 22 by the diaphragm plates 24 and heat exchange baskets 26 are stacked into these sectors 22. Located at the top and bottom of the air preheater and attached to the rotor housing 12 and to the top and bottom center sections 18 and 20, are the transition duct assemblies identified as 28, 30, 32 and 34. These transition duct assemblies attach the air preheater to the ducting for the air supply to and the flue gas from a steam generator or other combustion equipment. For example, the flue gas may enter the air preheater through transition duct 28, transfer the heat to the revolving rotor 14, and exit through transition duct 30. The combustion air enters through transition duct 32, picks up the heat from the rotor and exits through transition duct 34. These transition ducts are constructed to make the transition between the generally circular air preheater and the rectangular power plant ducts.

The problem that is encountered with air preheaters is that the flue gas which is flowing through the rotor often contains particulate material and/or condensible substances which can be deposited on the heat transfer surfaces in the baskets 26. This tends to clog up the air preheater and reduces the heat transfer efficiency. This problem is usually handled by providing sootblowing devices which travel across the face of the rotor as it is revolving and blow steam or air onto the rotor and into the flow channels through the heat transfer surface to dislodge the deposits. Since most of the deposits occur at the cold end (exit of the flue gas), the sootblower is normally located at the cold end (the lower end of FIG. 1).

Figure 2:
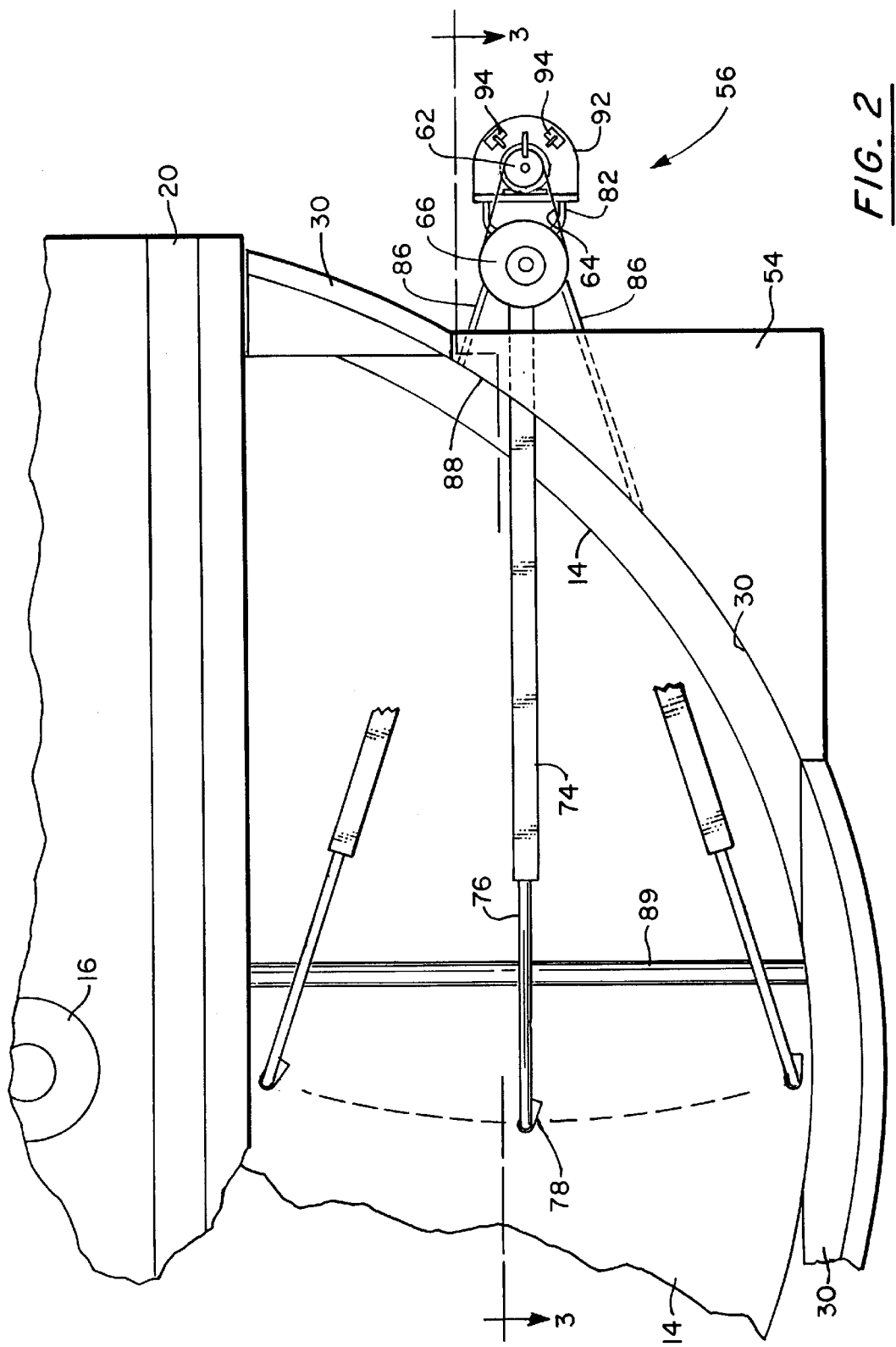
FIG. 2 is a bottom view of a segment of an air preheater illustrating the sootblower arrangement of the present invention.
Figure 3:
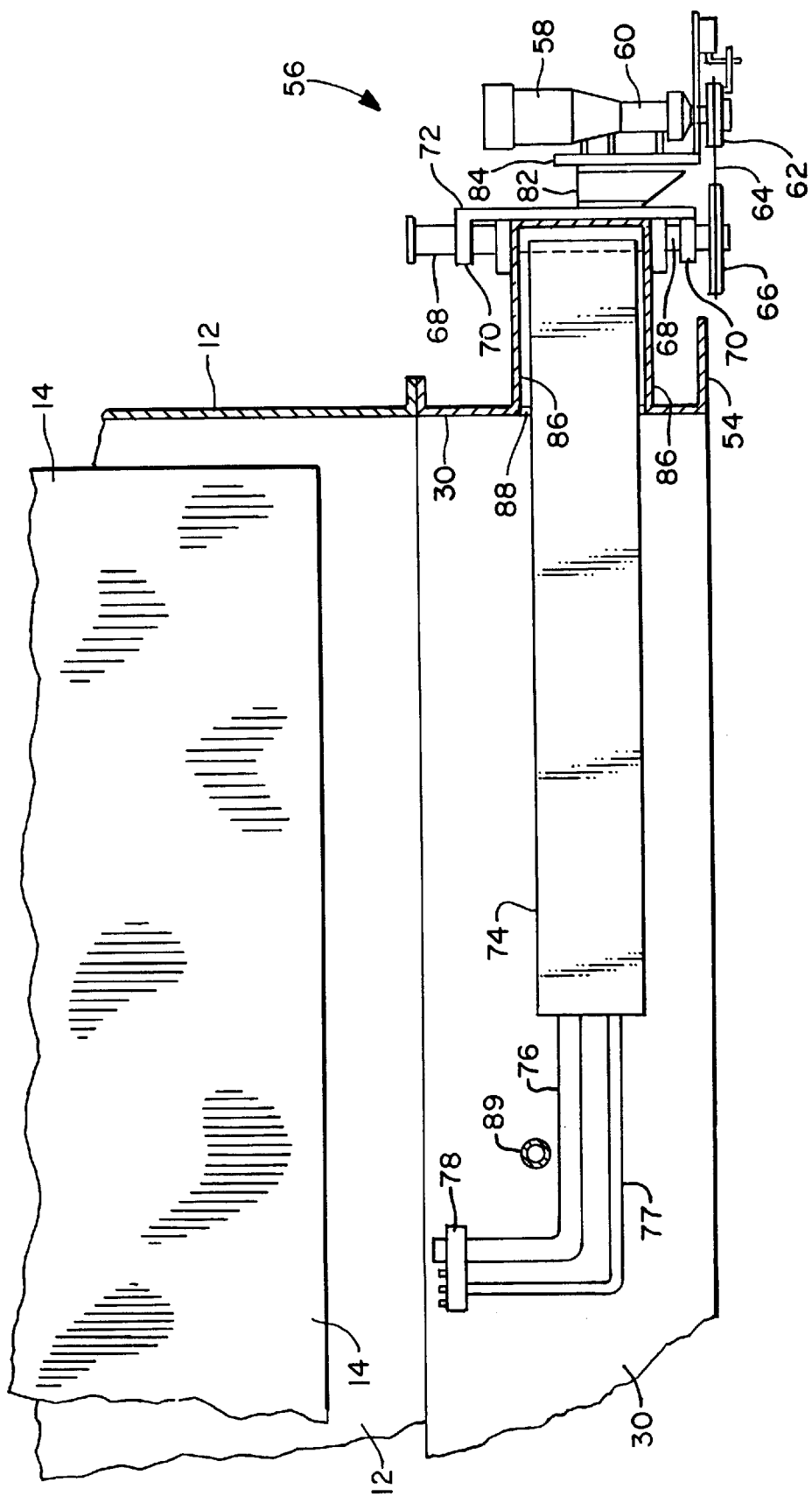
FIG. 3 is a cross-section view taken generally along line 3—3 of FIG. 2 and illustrating a quadrant of the lower portion of the air preheater.

The present invention relates to a sootblower and drive arrangement which results in the sootblower making a sweep across the face of the rotor and abruptly stopping while at the same time terminating the flow of sootblowing medium. FIG. 2 is a bottom view of one quadrant of an air preheater, similar to that shown in FIG. 1, and FIG. 3 is a vertical cross section view taken along line 3—3 of FIG. 2. These drawings illustrate the rotor 14, the rotor shaft 16 and the lower end center section 20. Attached to the side of the lower end center section 20 and attached to the lower edge of the rotor housing 12 is the transition duct 30. This transition duct 30 includes the flat horizontal plate section 54 so that the transition duct is adapted to mate with the air preheater or power plant ducting.

Attached to the outside of the transition duct 30 is the sootblower drive mechanism which is generally designated 56. The drive mechanism comprises a motor 58 which is connected through a speed reducer 60 to drive sprocket 62. The drive sprocket 62 preferably includes a torque-limiter clutch which will disengage the drive in the event that the sootblower lance (or any other part of the mechanism) becomes hung-up or jammed. The drive sprocket 62 is connected by the drive chain 64 to the driven sprocket 66.

Driven sprocket 66 is mounted to the rotatable pipe shaft 68 which is mounted by the bearing blocks 70 to the backing plate 72. Also attached to the shaft 68 is the sootblower lance assembly which comprises the rectangular pipe support 74 and the lance pipes 76 and 77 which terminate at the sootblower nozzle assembly 78 which will be described later. The lance pipes 76 and 77 are supported inside of the pipe support 74 which is attached to the rotatable pipe shaft 68. The bracket 82 supports the motor mounting plate 84 from the backing plate 72. As the motor 58 rotates the sprockets 62 and 66, the shaft 68 is rotated and swings the sootblower lance assemble, which is attached to the shaft 68, through a preselected arc as shown by the arc in FIG. 2. The lance pipe 76 as seen in FIGS. 2 and 3 is the conventional, relatively low pressure sootblowing lance carrying steam or air. The lance pipe 77 as seen in FIG. 3 is the high pressure lance pipe of the present invention carrying high pressure wash water. In general, the low pressure medium of the invention has a pressure in the range of 250 psig to 1000 psig whereas the high pressure water is in the range of 1000 psig to 10,000 psig.

Figure 4:
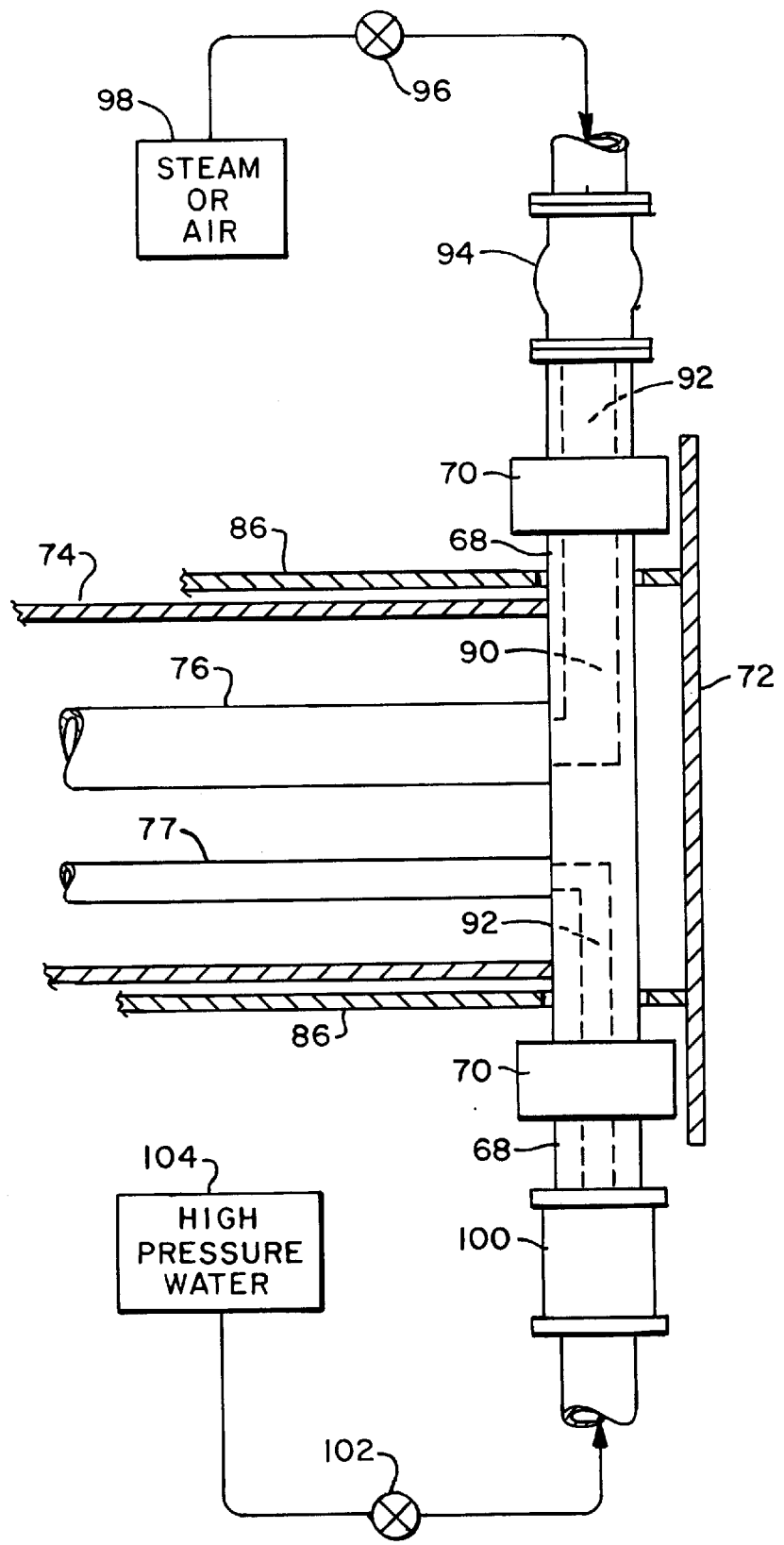
FIG. 4 illustrates the connection of the two sootblowing lance pipes to the sources of blowing medium.

Referring to FIG. 4, the rotatable pipe shaft 68 contains two separate channels, a low pressure air/steam channel 90 and a high pressure water channel 92. The low pressure channel is connected through a swivel ball joint 94 and a valve 96 to a low pressure air or steam source 98. The high pressure channel 92 is connected through a high pressure swivel joint 100 and a valve 102 to a high pressure wafer source 104.

The entire sootblower drive mechanism 56 is mounted to the side of the transition duct 30 by means of the plate assembly 86 which comprises a generally wedge-shaped box having top and bottom plates as shown in FIG. 3 and two side plates as shown in FIG. 2. One end of these plates is attached and sealed to the backing plate 72 with the other ends being attached and sealed to the transition duct 30. The transition duct 30 has an opening 88 whereby the inside of the plate assembly 86 communicates with the inside of the air preheater. This opening 88 is of such a size and configuration to permit the sootblower lance assembly to swing through its arc. The sealing of the plate assembly 86 to both the backing plate 72 and the transition duct 30 prevents any leakage from the air preheater to the atmosphere.

Extending across the rotor between the center section 20 and the duct 30 is a guard bar 89 seen in FIGS. 2 and 3. This guard bar 89 is located between the sootblower lance assembly and the rotor as close to the free end as practical without interfering with the nozzle. The purpose of this guard bar 89 is to restrict movement of the sootblower lance assembly and prevent possible contact with the rotor particularly when the sootblowing medium is turned on or off which can cause significant oscillation of the lance.

As an example, an air preheater with a rotor having a diameter of about 22 feet will have a sootblower lance assembly of about 11 feet and will have a cycle time of about 17 minutes (this is the time of travel through the arc in one direction.) In order to cover the entire rotor, the lance assembly will swing through an arc of about 40°. Air preheater rotors have a speed which can range between about 1 and 4 RPM usually depending upon size with larger rotors rotating slower. For details on the means for setting the arc of travel of the lance assembly and the means for initiating and terminating the flow of sootblowing medium, see the previously mentioned U.S. Pat. No. 5,626,184. These controls would be connected into the valves 96 and 104.

Figure 5:
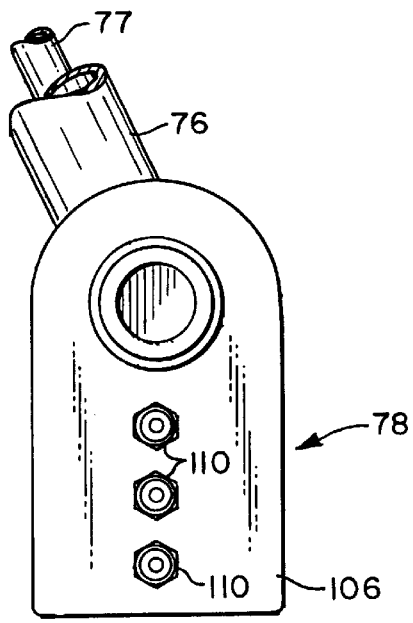
FIGS. 5 and 6 are detailed views of the nozzle arrangement of the invention.
Figure 6:
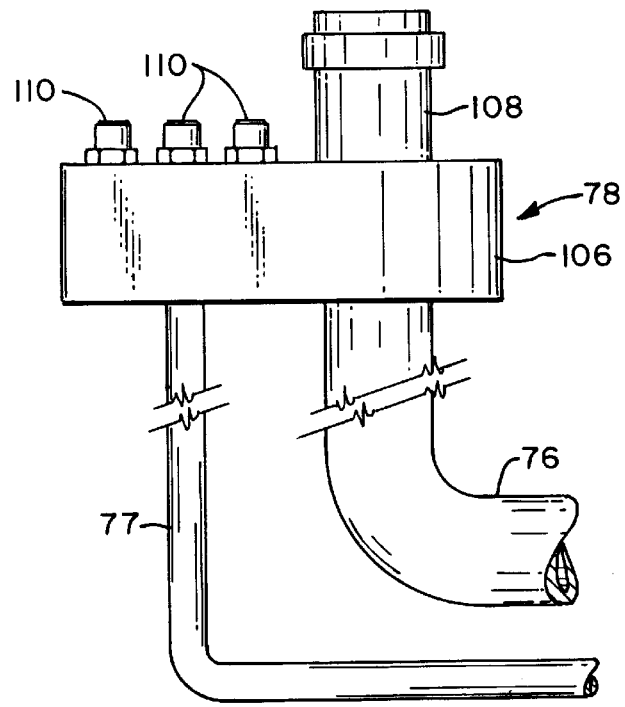

FIGS. 5 and 6 show the details of the nozzle assembly 78 which is connected to the low pressure lance pipe 76 and the high pressure lance pipe 77. The low pressure medium flows through a bore in the nozzle assembly block 106 to the low pressure nozzle 108. The high pressure wash water flows through a channel in the block 106 to the three high pressure nozzles 110. Although three high pressure nozzles are illustrated, any desired number could be used.

As seen in FIG. 5, the nozzle assembly 78 and the row of high pressure nozzles 110 are at an angle to the lance pipe 76 and to the lance pipe 77 which is not seen in this FIG. 5. That angle is also illustrated in less detail in FIG. 2. The angle is set such that the row of high pressure nozzles 110 are parallel with the heat exchange plates in the baskets 26 and tangential to the rotor (perpendicular to the radius of the rotor) at the outside of the swing of the swing-arm across the rotor. This row of nozzles will be at an angle between the radius and the tangent at the inside of the swing, typically about 40° from the tangent. This ensures that the maximum cleaning power occurs at the outside of the rotor where the relative velocity of the rotor is the greatest. For example, for a 27 foot diameter rotor, the velocity of the heat transfer plates at the inside of the rotor may be 286 inches per minute while the velocity of the outside plates may be 1,554 inches per minute. It is for this reason that more cleaning power per unit area of the rotor is needed at the outside. At the inside, the three nozzles are spread over a greater radial distance with less cleaning power per unit area and a wider range of coverage.

Although the invention has been described as a cleaning device mounted on the bottom of the air preheater and discharging up into the rotor, the invention equally applies to a top mounted cleaner discharging down into the rotor.

We claim:

1. A sootblower arrangement for a rotary regenerative air preheater having a heat exchange rotor with a center portion and a peripheral portion and comprising an oscillatable swivel shaft, means for oscillating said oscillatable swivel shaft and a sootblower arm assembly attached to said oscillatable swivel shaft, said sootblower arm assembly extending over a portion of said heat exchange rotor and terminating with a nozzle assembly and adapted to swing said nozzle assembly through an arc extending between an end point adjacent said center portion of said rotor and an end point adjacent said peripheral portion of said rotor, said sootblower arm assembly comprising a high pressure conduit connected to a source of high pressure cleaning water and a low pressure conduit connected to a source of a low pressure sootblowing medium, said low pressure conduit terminating at a low pressure nozzle in said nozzle assembly and said high pressure conduit terminating at a row of a plurality of high pressure nozzles in said nozzle assembly.

2. A sootblower arrangement as recited in claim 1 wherein said row of a plurality of high pressure nozzles is generally tangential to the peripheral portion of said heat exchange rotor when said nozzle assembly is at said end point adjacent said peripheral portion of said rotor.

* * * * *